United States Patent [19]

Chomel et al.

[11] Patent Number: 4,849,965

[45] Date of Patent: Jul. 18, 1989

[54] ASYNCHRONOUS DIGITAL TIME-DIVISION MULTIPLEXING SYSTEM WITH DISTRIBUTED BUS

[76] Inventors: Denis Chomel, Rue des Septs Tournants; Michel Devault, 22, rue de Bourgogne, both of 22300 Lannion; Hervé Le Bris, Kerenoc, 22560 Pleumeur Bodou; Yvon Rouaud, Les Fontaines A 33, 22300 Lannion, all of France

[21] Appl. No.: 73,293

[22] Filed: Jul. 7, 1987

Related U.S. Application Data

[63] Continuation of Ser. No. 740,838, May 21, 1985, abandoned.

[30] Foreign Application Priority Data

Oct. 14, 1983 [FR] France .................. 83 16365
Oct. 15, 1984 [WO] PCT Int'l Appl. ... PCT/FR84/00230

[51] Int. Cl.⁴ ............................................. H04J 3/02
[52] U.S. Cl. ......................................................... 370/85

[56] References Cited

U.S. PATENT DOCUMENTS 3,755,782  8/1973  Haas et al. ............... 340/825.08
4,000,378  12/1976  Caplan ........................ 370/90
4,016,369  4/1977  Pedersen ...................... 370/90
4,426,697  1/1984  Petersen et al. .............. 370/85

Primary Examiner—Benedict V. Safourek
Assistant Examiner—Wellington Chin
Attorney, Agent, or Firm—Laubscher, Presta & Laubscher

[57] ABSTRACT

The system comprises a first unidirectional packet bus having a bit rate D, each packet including an e-bit identifier and a b-bit package, sources having differing bit rates $d_i$ such that $d_m \leq d_i \leq d_M < D$, and access means for introducing packets from the sources into the first bus. An allocator located at the receiving end of the first bus builds up frames of identifiers identifying active sources. Each frame has a length $T = b/d_m$ and is shared into $N = d_M/d_m$ time slots. Each time slot has a period $\theta = b/d_M$ and includes a source identifier. The identifier for a same active source having a bit rate $d_i$ is repeated in the frame $n_i$ times such that $n_i = d_i/d_m$ when $d_i/d_m$ is an integer, or such that $n_i = 1 +$ integer part of $(d_i/d_m)$ otherwise. The identifier frames are transmitted from the allocator into a second unidirectional bus distributed to all the access means. The access means of each source transmits a packet in the first bus whenever a b-bit package delivered from the source is received and an identifier of the source is detected in the second bus after package reception.

10 Claims, 6 Drawing Sheets

ASYNCHRONOUS DIGITAL TIME-DIVISION MULTIPLEXING SYSTEM WITH DISTRIBUTED BUS

This application is a continuation of application Ser. No. 740,838 filed May 21, 1985, abandoned.

BACKGROUND OF THE INVENTION

1. Field of the Invention

The present invention relates to an asynchronous digital time-division multiplexing system with distributed bus.

2. Description of the Prior Art

The multiplexing mode in an asynchronous digital time-division multiplexing system is mid-way between the packet mode and the circuit mode. In an asynchronous time-division system, the digital paths from various sources are time-multiplexed after having been assembled into packets, as in the conventional packet-mode technique. Each packet consists of an identifier identifying the digital source path and an information package delivered from the source. Moreover, in accordance with the circuit-mode multiplexing technique, each packet carries a constant number of bits, and the packets are multiplexed in frame time slots; no error or flow check is carried out. The asynchronous time-division multiplexing technique is particularly intended for the design of a integrated service digital network on the subject of which the article by Jean-Pierre Coudreuse may be cited, entitled "Les réseaux temporels asynchrones: du transfert de données à l'image animée" (Asynchronous time-division networks: from data to moving pictures) published in Echo des RECHERCHES, No. 112, 2nd quarter 1983, pages 33 to 48.

More particularly, this invention deals with an asynchronous time-division multiplexing system for concentrating and multiplexing digital source paths having differing bit rates. These sources are linked along an interconnection bus, as briefly described on pages 47 and 48 of the aforementioned article under the title "PRELUDE: les bases d'un réseau expérimental" (PRELUDE: the bases of an experimental network").

OBJECT OF THE INVENTION

The object of the present invention is to provide an asynchronous digital time-division multiplexing system with distributed bus in which the introduction of a packet from an active source does not require an access request from the source in order to avoid a signal exchange between the source and a packet concentrator for each packet transmission and, as a corollary thereto, in order to permit a high rate operation of the packet transmitting the bus. The packet multiplexing mode does not make use of the inactivity times of sources to multiplex a greater number of packets.

SUMMARY OF THE INVENTION

Accordingly, an asynchronous digital time-division multiplexing system comprising a first unidirectional bus having a predetermined bit-rate D for transmitting packets each including a source identifier having e bits and a package having b source bits, plural sources respectively delivering digital signals having different bit rates lying between a minimum bit rate $d_m$ and a maximum bit rate $d_M$ less than the predetermined bit rate D in the first bus, and plural access means linking the sources along the first bus for introducing packets into the first bus from the sources respectively, is characterized in that it comprises allocating means located at the receiving end of the first bus for constituting frames of identifiers identifying the sources, each frame having a length T equal to $b/d_m$ and being split into a number N of time slots equal to $d_M/d_m$, each time slot having a period $\theta$ equal to $b/d_M$ and including a source identifier, each identifier of the same source having a bit rate $d_i$ being repeated in the frame T $n_i$ times such that $n_i = d_i/d_m$ when the ratio $d_i/d_m$ is an integer, or such as $n_i = 1 +$ integer part of $(d_i/d_m)$ when the ratio $d_i/d_m$ is not an integer, in that the identifier frames are transmitted from the allocating means into a second unidirectional bus distributed to all the access means, and in that the access means of each source transmits a packet into the first bus whenever a b-bit package from the source is received and an identifier of the source is detected in the second bus after package reception.

BRIEF DESCRIPTION OF THE DRAWING

The invention will be more explained from the following description of a preferred embodiment of the invention with reference to the appended corresponding drawings in which.

DESCRIPTION OF THE PREFERRED EMBODIMENTS

Figure 1:
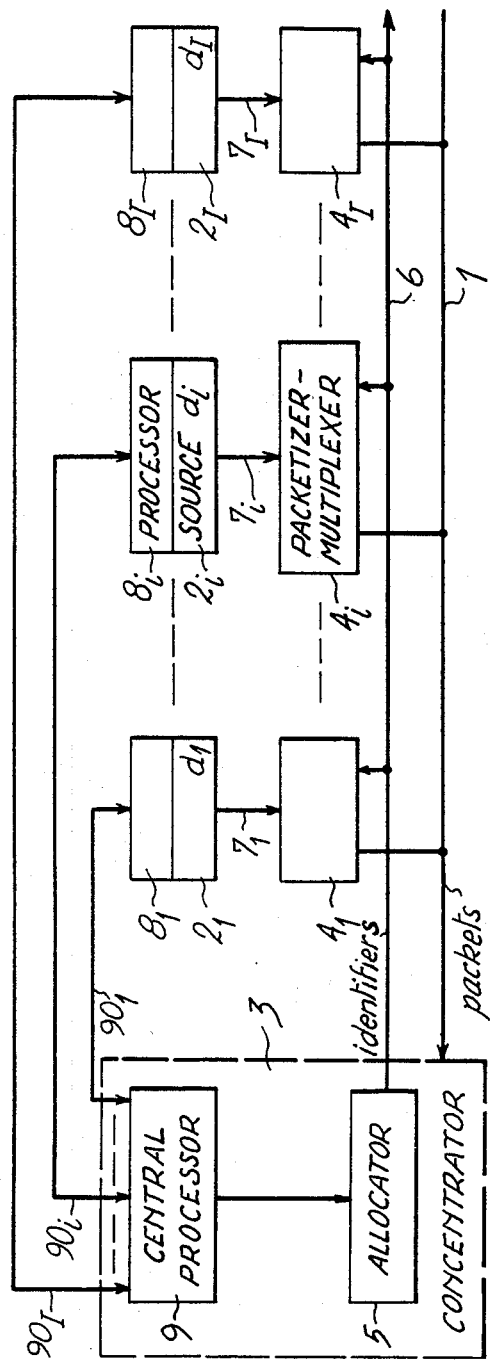
FIG. 1 is a schematic block diagram of the asynchronous digital time-division multiplexing system with distributed bus according to the invention.

With reference to FIG. 1, an asynchronous digital time-division multiplexing system comprises a unidirectional bus 1 for the distributed transmission of data packets from data sources $2_1$ to $2_I$ towards a data concentrator 3 connected to an asynchronous time switching network. Each source is connected to bus 1 across a packetizer-multiplexer $4_1$ to $4_I$. Each packetizer-multiplexer $4_1$ to $4_I$ is authorized to transmit a data packet in bus 1 under the control of an allocator 5 included in concentrator 3 via a unidirectional bus 6 distributed over each of the packetizers-multiplexers.

Sources $2_1$ to $2_I$ respectively transmit data to packetizers-multiplexers $4_1$ to $4_I$ through digital paths $7_1$ to $7_I$ having bit rates $d_1$ to $d_I$. The rates $d_1$ to $d_I$ differ from one to the other generally speaking, and lie between a minimum rate value $d_m$ and a maximum rate value $d_M$. Sources $2_1$ to $2_I$ are respectively associated with control processors $8_1$ to $8_I$ that make it possible to tell a central processor 9 included in concentrator 3 when the sources are activated. Central processor 9 is connected to processors $8_1$ to $8_I$ through a star structure of bidirectional links $90_1$ to $90_I$ in which are carried various signalling signals between each source and the processor 9 so that the source may request access to bus 1 in order to transmit data and thus indicates its activation at the start of a communication or so that the source may advise its deactivation at the end of a communication. The signalling signals are transmitted for example in accordance with a known packet exchange protocol such as a high level data link control procedure (HDLC) via the star structure. In what follows, consideration is lent to the operation of active sources after the exchange of signalling signals at the start of a communication. At a given time, some sources are active and some sources are inactive. Each of packetizer-multiplexers $4_1$ to $4_I$ connected to an active source $2_1$ to $2_I$ the digital signal transmitted by digital path $7_1$ to $7_I$ from respective active source $2_1$ to $2_I$ in the form of packets $P_1$ to $P_I$. Each packet $P_1$ to $P_I$ to be transmitted in bus 1 is made up of a data package having a predetermined number of bits $b=k.e$, where k is an integer, and a source identifier $E_1$ to $E_I$ having e bits preceding the package. An identifier $E_i$ is a binary word representing the number i of the source $S_i$, where i is an integer varying between 1 and I. Bus 1 carries in asynchronous mode the time-division multiplexed packets delivered from packetizers-multiplexers associated with several simultaneously active sources having received an authorization to transmit from allocator 5 via allocation bus 6.

Figure 2:
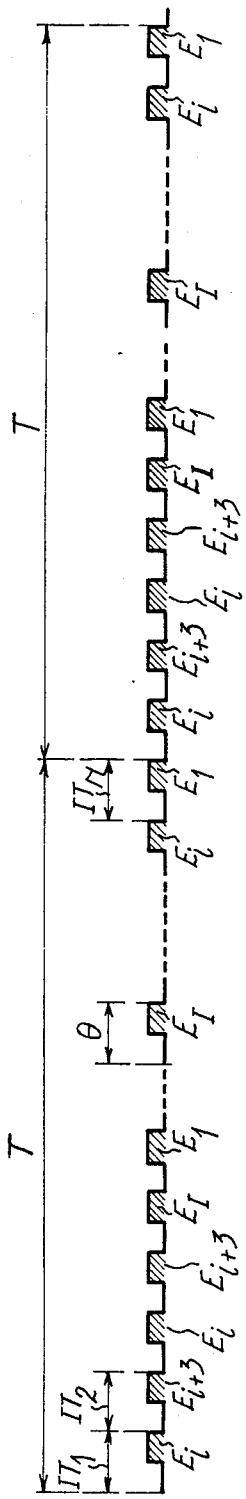
FIG. 2 shows the identifier frame structure.

As depicted in FIG. 2, bus 6 carries a periodic frame having a length T and split into N time slots $IT_1$ to $IT_N$ each having a length $\theta$. Each time slot IT is intended for transmitting an identifier E. The identifiers E are multiplexed in the frame T in allocator 5 in terms of the active source bit rates $d_1$ to $d_I$.

The source minimum and maximum bit rates $d_m$ and $d_M$, together with time frame parameters $\theta$ and T are determined in terms of the transmission characteristics of packet transmission bus 1 and the numbers of bits e and b. The characteristics of bus 1 are as follows:

length L of buses 1 and 6 between packetizer-multiplexer 1 nearest concentrator 3 and packetizer-multiplexer $4_I$ farthest from concentrator 3;

real bit rate D of bus 1 decidedly higher than the maximum bit rate $d_M$ such that bus 1 may carry packets from at least one source having the maximum bit rate $d_M$;

$\tau$ = propagation time per length unity in buses 1 and 6.

Figure 3:
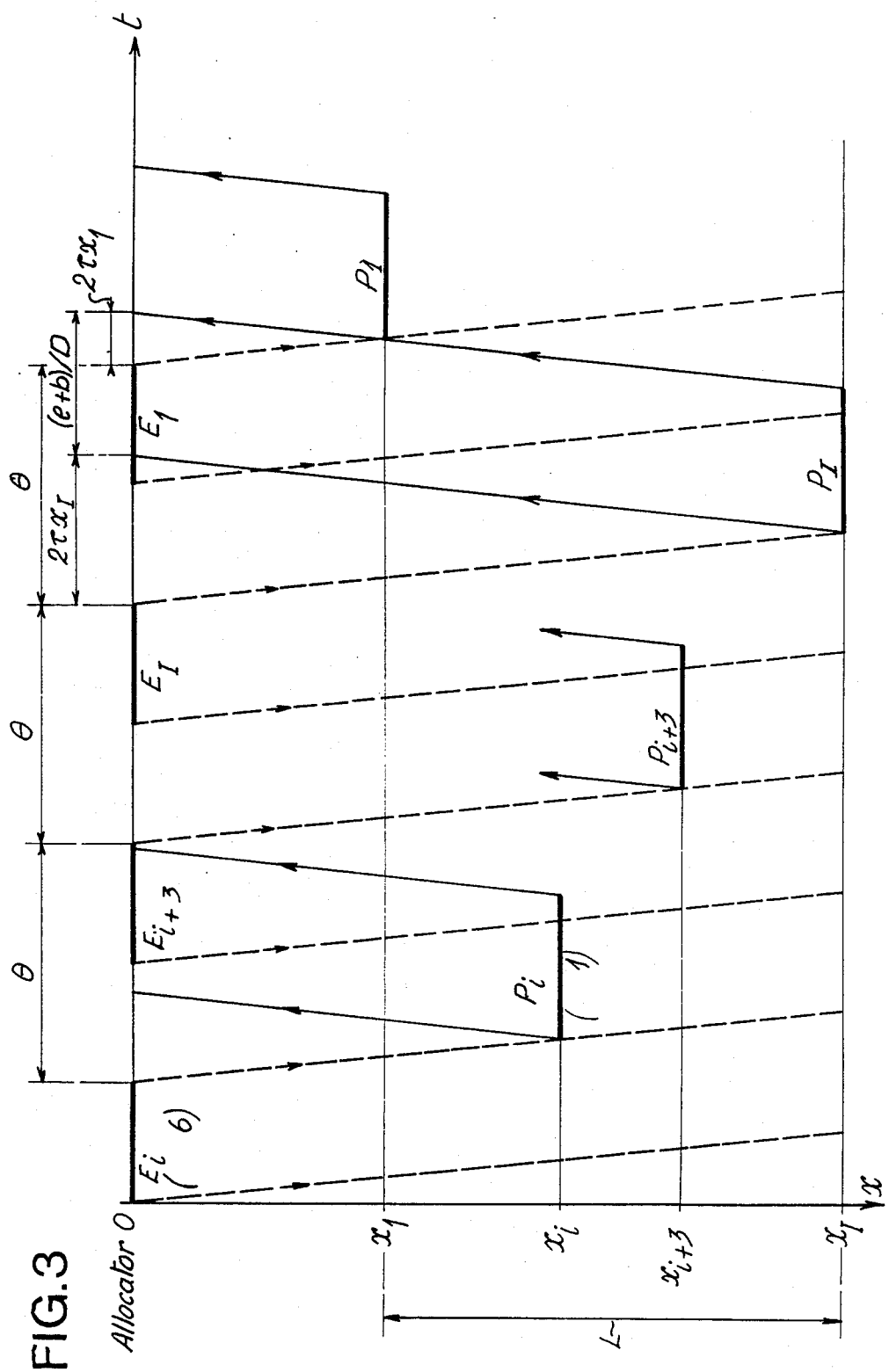
FIG. 3 shows packet propagation charts for the first packet transmission bus.

FIG. 3 depicts the propagation chart for packets from four packetizer-multiplexer $4_i$, $4_{i+3}$, $4_I$ and $4_1$ that are authorized to insert packets in bus 1 in the order indicated in the identifier frame formed by allocator 5 and shown in FIG. 2. The order of the authorizations is as follows: . . . i, i+3, I, 1. . . . If $x_i$ denotes the distance between allocator 5 and packetizer-multiplexer $4_i$, a transmission procedure for a packet $P_i$ from packetizer-multiplexer $4_i$ commences with the transmission of the identifier $E_i$ into bus 6 for a propagation time $\tau x_i$ and then finishes with the transmission of the packet $P_i$ delivered by packetizer-multiplexer $4_i$ into bus 1 for a propagation time $\tau x_i$.

For allocator 5 to authorize successively the transmission of packets from any packetizer-multiplexer with no packet overlap, the packet allocation and transmission duration $\theta$ is selected for the least favorable case in which the transmission of a packet $P_I$ from packetizer-multiplexer $4_I$ farthest (distance $x_I$) from concentrator 3 is followed by the transmission of a packet $P_1$ from packetizer-multiplexer $4_1$ nearest (distance $x_1$) concentrator 3. To receive the packets $P_I$ and $P_1$ successively without any dead time or overlap, the following relationship must be satisfied:

$$\theta = 2\tau x_I + (e+b)/D - 2\tau x_1.$$

The above relationship is deduced by analysis from the right hand side of the chart in FIG. 3. The above relationship may also be expressed as:

$$\theta = 2\tau(x_I - x_1) + (e+b)/D.$$

The time $\theta$ depends therefore not on the total length of buses 1 and 6 but rather on the distance $L = x_I - x_1$ between packetizer-multiplexer $4_1$ and $4_I$ at the ends.

The dead time $2\tau L$ included in the allocation duration, during which time a packetizer-multiplexer transmits no digital signals, is independent of the real bit rate D in bus 1, whereby distributed packetizer-multiplexer may be conceived with a very high bit rate and using short packets. The shortness of the packets makes it possible to use a low-capacity buffer memory.

Granted that just one packet can be transmitted in a slot $\theta$, the maximum bit rate $d_M$ of the sources is therefore equal to $b/\theta$. On the contrary, for a packetizer-multiplexer to deliver just one packet in the frame time T, the minimum bit rate $d_m$ of the corresponding source must be equal to $b/T = b/(N\theta)$. When a source has a bit rate $d_i$ between the minimum rate $d_m$ and the maximum rate $d_M$, the corresponding label $E_i$ is repeated periodically or otherwise in the frame T a number $n_i$ of times such that:

$n_i = d_i/d_m$ if the ratio $d_i/d_m$ is an integer or $n_i =$ (integer part of $(d_i/d_m))+1$ if the ratio $d_i/d_m$ is not an integer.

Should the ratio $d_i/d_m$ not be an integer, the last packet authorized to be transmitted in the frame T of bus 1 from the corresponding packetizer-multiplexer comprises a bit number less than $p = e+b$ and can be transmitted such as with filling bits as per a known procedure, or can be transmitted with a part of the following package at the start of the following frame as will be seen through the description of a packetizer-multiplexer.

Figure 4:
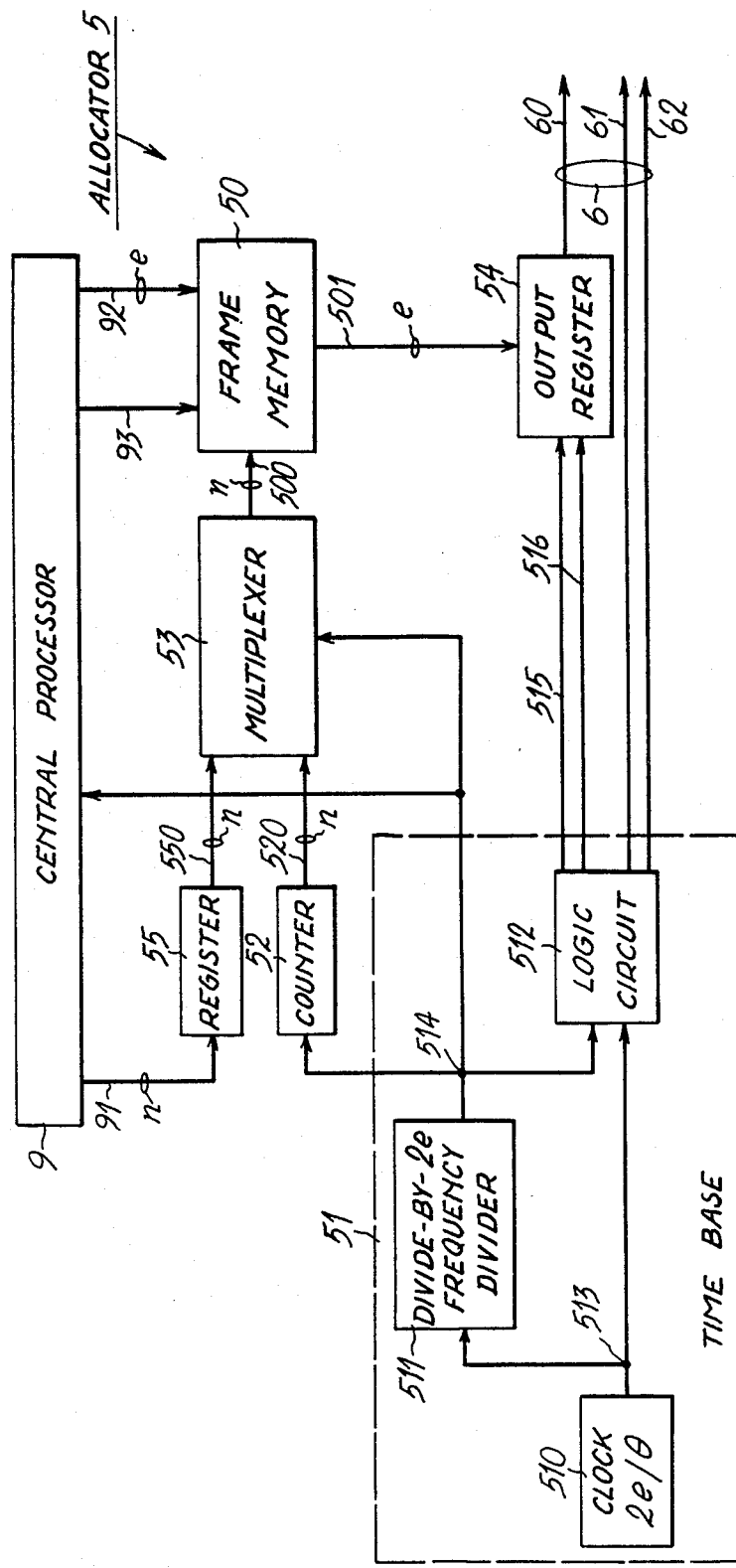
FIG. 4 is a block diagram of the system allocator.

With reference to FIG. 4, allocator 5 comprises a random access memory RAM 50. Memory 50 contains N cells, each having e bits, for memorizing the N identifier words included in a frame T. Allocator 5 further comprises a time-base 51 as well as means under the control of central processor 9 for writing the identifiers associated with the packetizer-multiplexers that are authorized to transmit packets into bus 1, and means under the control of the time-base for reading the identifiers written in memory 50 to transmit an identifier frame of identifiers into allocation bus 6. Bus 6 is made up of three digital lines 60, 61 and 62. Line 60 carries the label frames. Line 61 carries an allocation presence signal synchronous with the frame identifiers. Line 62 carries a clock signal corresponding to the rate of the identifier bits in line 60.

Time base 51 includes a clock 510, a divide-by-2e frequency divider 511 and a logic circuit 512.

Figure 5:
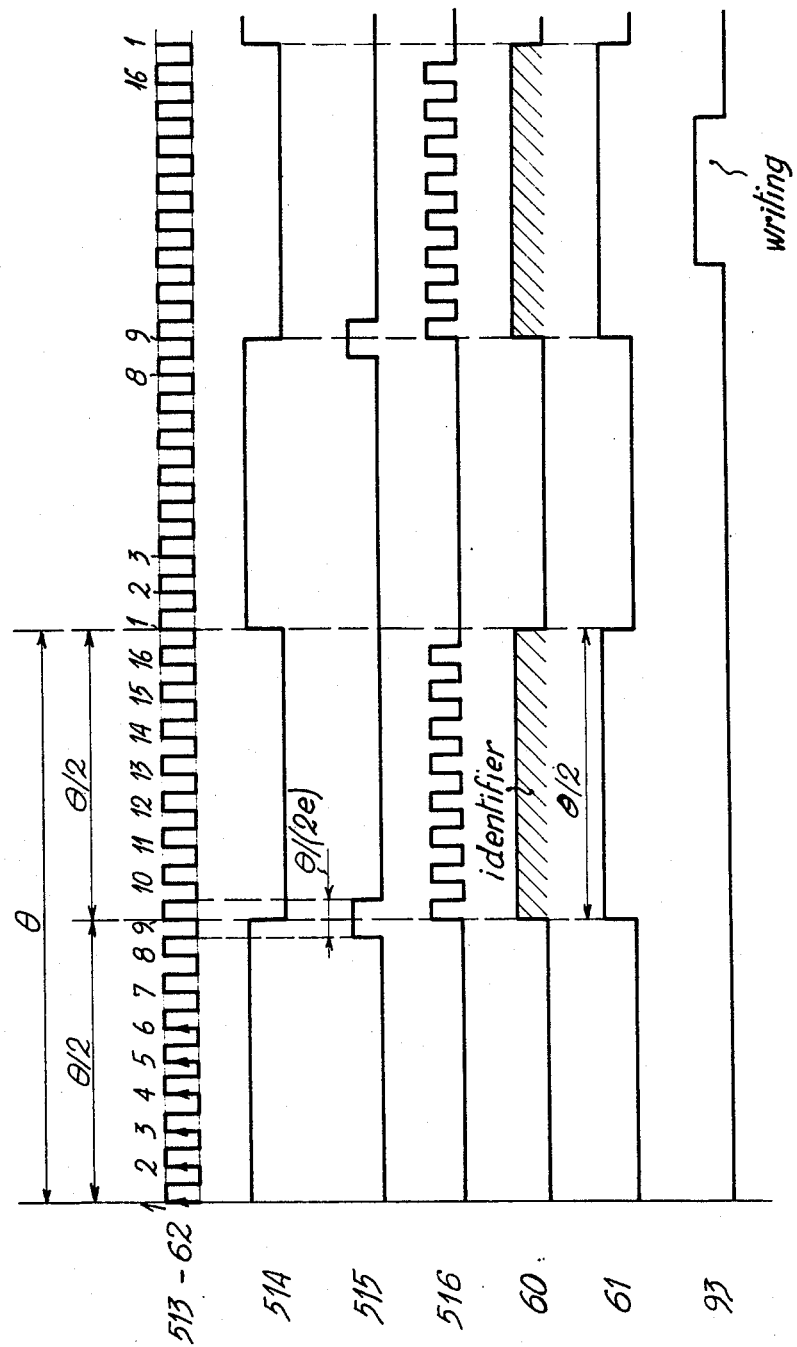
FIG. 5 shows time charts of various signals derived in the allocator.

Output 513 of clock 510 supplies a clock signal having identifier bit frequency $2e/\theta$ in transmission line 60. Clock output 513 is connected to an input of frequency divider 511 and to an input of logic circuit 512. Output 514 from frequency divider 511 delivers a signal at the allocation frequency $1/\theta$. Signals at outputs 513 and 514 are respectively shown in the first two time charts in FIG. 5. A first half-period of each signal period $\theta$ at output 514 is intended systematically for reading addressing of memory 50 and the transfer of available information into an output register 54 at the end of the first half-period. A second half-period of each period $\theta$ is intended, where applicable, for writing and reading addressing an identifier in memory 50. The access to memory 50 is for this purpose alternately synchronized in reading and writing by the signal on output 514 of frequency divider 511.

Output 514 of divider 511 is connected to a counting input of counter 52, an input-selecting input of a dual-input multiplexer 53 and an input of logic circuit 512. Counter 52 has a cycle equal to the number N of time slots IT in the frame T, when N is chosen as equal to a power of 2. An output counter bus 520 having $n = \log_2 N$ leads supplies the reading addresses of the cells containing the successive identifiers in the frame T to one of the two inputs of multiplexer 53 that passes them onto an address input 500 of memory 50 during the first half-periods of periods $\theta$ in the frame. A loading pulse shown in a third time chart depicted in FIG. 5 marks the transition between the first and second half-periods of each period $\theta$. Each loading pulse has a length equal to $\theta/(2e)$. The loading pulse is supplied by an output 515 of logic circuit 512 to an input of output register 54, and orders loading of the reading addressed identifier from into memory 50 into output register 54, via an e-lead output bus 501 of memory 50.

Logic circuit 512 also delivers an allocation signal into line 61, a clock signal into line 62 and a clock signal on output 516 to transfer the serialized identifier bits from register 54 to line 60. The signals on output 516 and in lines 60, 61 and 62 are shown in fourth, fifth, sixth and first time charts in FIG. 5 respectively. The signals on output 516 and in line 62 result from the clock signal on clock output 513. The allocation signal in line 61 is composed of blanks having a length $\theta/2$ and interlaced with the identifiers in line 60.

The writing operation for one identifier in memory 50 is decided by central processor 9 upon receipt thereby of a request to connect or a request to disconnect from the corresponding source through the respective star structure link $90_1$ to $90_j$.

A request to connect from a source $8_i$ operating with bit rate $d_i$ consists for central processor 9 of writing the source $8_i$ identifier $E_i$ $n_i$ times in memory 50 in $n_i$ free cells, corresponding therefore to free time slots IT in the frame T. If processor 9 does not find a sufficient number of available words, it refuses the request to connect.

On the contrary, a request to disconnect from source $8_i$ consists of erasing the source ascribed words in memory 50 that are then each replaced by a predetermined word, containing for example only zero bits, that differs all the identifier words $E_1$ to $E_j$.

To prevent processor 9 from going access to memory 50 in reading, the search of free words for connection purposes or of erasable words for disconnection purposes is carried out in a memory analogous to memory 50, located in processor 9. The modifications to said analogous memory are transferred to memory 50. At a given time, certain time slots IT in frame T can contain the predetermined word for which no packetizer-multiplexer is programmed.

The cell writing addresses in memory 50 are fed selectively to addressing input 500 of memory 50 by an n-lead output 91 from processor 9 via a buffer register 55, a second input bus 550 of multiplexer 53 and multiplexer 53. Processor 9 receives the synchronization signal delivered from output 514 of frequency divider 511. During the first half-period of a period $\theta$, the processor loads the writing address into register 55, on the occasion of a writing cycle being under preparation. During the second half-period of period $\theta$, the writing address is fed to memory 50, via multiplexer 53. The identifier to be written is supplied from central processor 9 to memory 50 through an e-lead bus 92. A writing signal for memory 50 is provided by a link 93 in the middle of the second half-period in the period $\theta$. The signal in link 93 is shown in a last time chart in FIG. 5.

Figure 6:
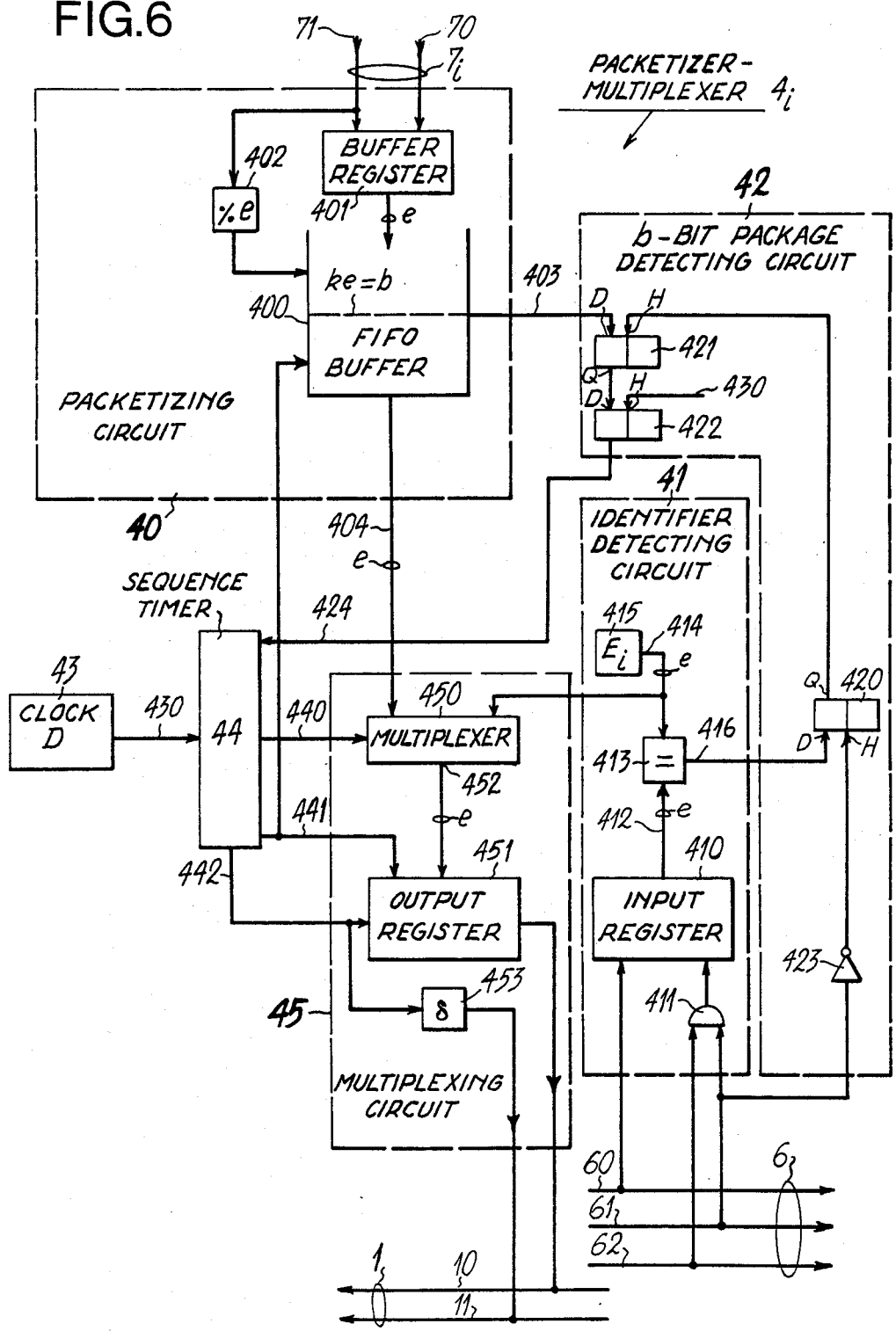
FIG. 6 is a block diagram of a packetizer-multiplexer linking a source to the two system buses.

A packetizer-multiplexer $4_i$ connected to corresponding source $2_i$ via digital path $7_i$ is shown in detail in FIG. 6. Path $7_i$ consists of a digital line 70 carrying a data signal having the bit rate $d_i$, and a digital line 71 carrying a clock signal having the frequency $d_i$.

Packetizer-multiplexer $4_i$ comprises a packetizing circuit 40 for packetizing the bits transmitted from line 70 into data bit groups or packages having $k.e = b$ bits. Circuit 40 comprises a first-in first-out FIFO buffer 400 that receives e-bit words having bits made parallel by a buffer register 401 connected to path $7_i$. Writing in buffer 400 is timed by a writing signal having frequency $d_i/e$, supplied from a divide-by-e frequency divider 402 connected to line 71.

On the side of identifier distributing bus 6, packetizer-multiplexer $4_i$ comprises an identifier detecting circuit 41 for detecting identifier $E_i$ ascribed to source $2_i$, and a data bit group detecting circuit 42.

Label detecting circuit 41 comprises an e-stage input register 410 that successively stores the frame identifiers transmitted from line 60 in bus 6. The identifiers are written in time with the clock signal in line 62, during the allocation times $\theta/2$ supplied by the allocation signal in line 61, by means of a two-input AND gate 411. The identifiers in line 60 are delivered from an e-lead output bus 412 of register 410 and are fed to a first input of a digital comparator 413. A second input of comparator 413 is connected to an e-lead output bus 414 of a register 415, such as a read only memory REPROM having memorized the identifier $E_i$. When contents in registers 410 and 415 are equal, output 416 comparator 413 is in state "1", which indicates that a packet having $p = b + e$ bits can be entered in bus 1.

Package detecting circuit 42 detects when k e-bit words have been stored and hence when a package of b bits has been formed in buffer 400. Circuit 42 then indicates that such a package can be transmitted in bus 1 in response to the detection of an identifier $E_i$ in bus 6. Circuit 42 comprises three flips-flops 420, 421 and 422 that change states under the effect of rise fronts applied to their clock inputs.

Data input D and clock input H of first flip-flop 420 are respectively connected to output 416 of comparator 413 and to line 61 via an inverter 423. Input D and clock input H of second flip-flop 421 are respectively connected to a predetermined output terminal 403 of buffer 400 and to output Q of flip-flop 420. Terminal 403 is at state "1" when buffer 400 contains at least b bits. Input D and clock input H of third flip-flop 422 are respectively connected to output Q of flip-flop 421 and to an output 430 of a clock 43 included in packetizer-multiplexer $4_i$. The clock signal from output 430 carries a frequency D equal to the real bit rate in bus 1.

Figure 7:
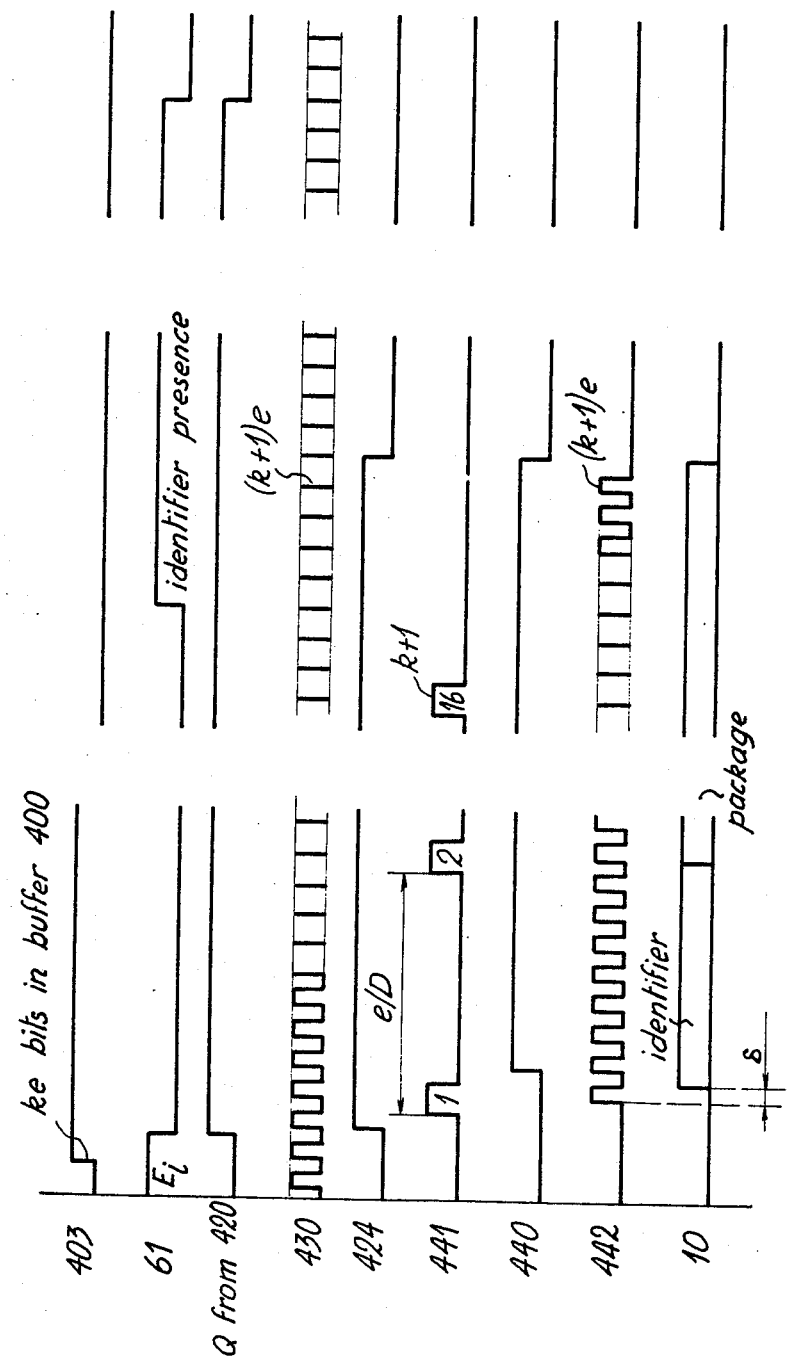
FIG. 7 shows time charts of various signals derived in the packetizer-multiplexer.

Signals from output 403 of buffer 400, in line 61, from output Q of flip-flop 420, from output 430 of clock 43 and from output 424 of flip-flop 422 are shown in first five time charts in FIG. 7, when an identifier $E_i$ is detected after a b-bit package has been stored in buffer 400. The signal from output 424 of flip-flop 422 indicates the presence of at least b bits in buffer 400 and the allocation of a time slot $\theta$ in bus 1 in order to enter a package having b bits. The package is transmitted onto bus 1 under the control of a sequence timer 44 via a multiplexing circuit 45 included in packetizer-multiplexer $4_i$, as soon as timer 44 is triggered by the signal on output 424 from flip-flop 422.

Multiplexing circuit 45 comprises essentially a multiplexer 450 having two input e-lead buses, and an output e-stage register 451 connected to e-lead output bus 452 of multiplexer 450. In response to the trigger signal on output 424 of third flip-flop 422, timer 44, via a lead 440 in state "0", controls the selection of a first input bus of multiplexer 450 connected to output 414 of identifier $E_i$ register 451 under the effect of a first loading pulse in a lead 441. The k e-bit words grouped in the bottom of FIFO buffer 400 are read successively by timer 44. The timer, via lead 440 in state "1", controls the selection of a second input bus of multiplexer 450 connected to output e-lead bus 404 of buffer 400 such that the k e-bit words are successively loaded in output register 451 as controlled by k loading pulses in lead 441. The loading pulses are equal in length to 1/D and are delivered at a period equal to e/D. The (k+1) e-bit words thus read are transmitted in series in a digital line 10 in bus 1 from the output of register 451 timed by a clock signal delivered in a lead 422 and including (k+1)e pulses having the same frequency as that of clock signal 43 and starting one clock period after signal rise at output 424 of flip-flop 422. The shift clock signal in lead 442 is delayed in a delay circuit 453 by a value δ of positioning time of one stage in register 451 and is transmitted in a digital line 11 in bus 1 in sychronism with the (k+1)e bits of the packet transmitted in line 10. Signals in leads 441, 440 and 442 and in line 10 are shown on last four lines in FIG. 7.

When comparator 413 has detected an identifier $E_i$ in line 60 and the bottom of waiting store 400 contains a number of e-bit words less then k, no signal triggering off timer 44 is delivered from output 424 of third flip-flop 422. This condition is due for example to a period of momentary non-transmission of data from source $2_i$ into line 70 or, generally speaking, to an asynchronism between the transmission of identifiers $E_i$ in line 60 and the appearance of ke bits in buffer 400. Between the detection of the previous identifier $E_i$ not triggering off the timer and the detection of the next identifier $E_i$ in line 60, the level of ke bits in buffer 400 can be exceeded. The capacity of the FIFO buffer must therefore be greater than ke=b bits.

Should the access authorizations to bus 1, i.e. the identifiers $E_i$, be transmitted into bus 6 in a strictly periodic manner, and the number of identifiers $E_i$ per frame T by strictly equal to $d_i/d_m$, as indicated by identifiers $E_i$ in the frames in FIG. 2, a constant phase-shift exists between the positive comparisons in comparator 413 and the storage of ke bits in buffer 400. At the worst, the phase-shift can be equal in length to one package. The capacity of FIFO buffer 400 is therefore at least equal to 2b=2ke bits. In practice, the capacity of waiting store 400 is chosen as greater than 2b bits in order to relax the making-up of the frame and, in particular, to allow non-periodic identifier distribution within the frame, as indicated by identifier $E_{i+3}$ in the frames in FIG. 2.

The asynchronous digital time-division multiplexing system with distributed bus as in the invention is destined notably for a company local network or a subscriber installation local network to be linked to an integrated service digital network via concentrator 3. Each source consists of data transmitting means included in a local network terminal. The bit rate in each source can be:

equal to a few kbit/s for facsimile data for example; or
between 64 kbit/s and 1 Mbit/s for medium or high frequency audio digital transmission; or
on the order of 100 Mbit/s for moving picture transmission.

By way of a particular embodiment, the values of the parameters defined in the foregoing description are:
length $L=x_I-x_l=50$ meters;
real bit rate D in bus 1=250 Mbit/s;
propagation time per length unity τ in buses 1 and 6=5ns/m;
number e of bits per identifier=8 bits;
number of bits ke per package:

$$b=ke=15\times 8=120 \text{ bits};$$

number of bits per packet:

$$p=e+ke=128 \text{ bits};$$

allocation time θ=1 μs;
number N of time slots IT in a frame:

$$2^n=2^{14}=8192;$$

maximum source bit rate $d_M=b/\theta=120$ Mbit/s;
minimum source bit rate $d_m=b/(N\theta)=14.6$ kbit/s.

What we claim is:

1. An asynchronous digital time-division multiplexing system, comprising
    (a) plural data sources each having active and inactive states and being identified by respective identifiers, each active source supplying data bits with a corresponding bit rate, and said corresponding bit rates of said active sources being different therebetween;
    (b) plural access means associated with said data sources, respectively, for linking each associated data source to an identifier bus and to a packet bus, each access means transmitting a packet into said packet bus in response to each identifier of said associated data source detected on said identifier bus, and each transmitted packet consisting of said identifier and a group of data bits delivered by said associated data source; and
    (c) allocating means linked to said identifier bus for constituting identifier frames and transmitting said frames into said identifier bus; and wherein
    (d) each said identifier frame has a determined length and is composed of said identifiers corresponding to said active sources; and
    (e) each identifier is repeated in said identifier frame a number of times approximately proportional to said bit rate of said active source corresponding to said identifier.

2. The system defined in claim 1, wherein said data sources have bit rates between a minimum bit rate $d_m$ and a maximum bit rate $N.d_m$ less than a predetermined bit rate D of said packet bus, where N is an integer, each identifier frame has a length equal to $b/d_m$ and is split into N time slots, where b is a number of bits of said data bit group, each time slot has a period equal to $b/(N.d_m)$ and includes one identifier, and further wherein each identifier has a bit rate $d_i$ and is repeated in said frame $n_i$ times such that $n_i=d_i/d_m$ and $n_i=1+$(integer part of ($d_i/d_m$)) when $d_i/d_m$ is equal to and different from an integer, respectively.

3. The system defined in claim 2, wherein said length of each frame time slot is equal to $(e+b)/D$ increased by an amount equal to twice a bit propagation time in said identifier and packet buses between one of said access means nearest said allocating means and one of said access means farthest from said allocating means, where e is a number of bits of said identifier.

4. The system defined in claim 2, wherein said access means associated with said respective data source comprises means for detection said data source identifier in said identifier bus, means for assembling said data bits supplied progressively from said data source into said data bit groups, means for detecting each of said assembled data bit groups to deliver a triggering signal in response to each detected data source identifier following said data bit group assembly, and means for transmitting a packet made up of said data source identifier and said assembled data bit group into said packet bus in response to said triggering signal.

5. The system claimed in claim 4, wherein said assembling means in said access means comprises a first-in first-out (FIFO) buffer having a capacity equal at least to 2b bits.

6. An asynchronous digital time-division multiplexing system, comprising
  (a) plural data sources each having active and inactive states and being identified by respective identifiers, each active source supplying data bits with a corresponding bit rate, and said corresponding bit rates of said active sources being different therebetween;
  (b) plural access means associated with said data sources, respectively, for linking each associated data source to an identifier bus and to a packet bus, each access means transmitting a packet into said packet bus in response to each identifier of said associated data source detected on said identifier bus, and each transmitted packet consisting of said identifier and a group of data bits delivered by said associated data source; and
  (c) allocating means, linked to said identifier bus for constituting identifier frames and transmitting said frames into said identifier bus, each identifier having a determined length and being composed of said identifiers corresponding to said active sources; and wherein
  (d) said data sources have bit rates between a minimum rate $d_m$ and a maximum bit rate $N.d_m$ less than a predetermined bit rate D of said packet bus, where N is an integer, each identifier frame has a length equal to $b/d_m$ and is split into N time slots, where b is a number of bits of said data bit group, each time slot has a period equal to $b/(N.d_m)$ and includes one identifier, and further wherein each identifier has a bit rate $d_i$ and is repeated in said frame $n_i$ times such that $n_i = d_i/d_m$ and $n_i = 1 +$ (integer part of ($d_i/d_m$)) when $d_i/d_m$ is equal to and different from an integer, respectively; and
  (e) said allocating means comprises means for storing identifiers in N memory-cells to constitute one frame, means for systematically providing N cell addresses to read said stored identifiers during first half-periods of said time slots in said frame, thereby to insert said read identifiers in said second bus during second half-periods of said frame time slots, respectively, and means for selectively providing an identifier writing address during one of the second half-periods of said frame time slots to write said identifier in said storing means during the second half-period of a following time slot.

7. The system defined in claim 6, wherein said length of each frame time slot is equal to $(e+b)/D$ increased by an amount equal to twice a bit propagation time in said identifier and packet buses between one of said access means nearest said allocating means and one of said access means farthest from said allocating means, where e is a number of bits of said identifier.

8. The system defined in claim 6, wherein said access means associated with said respective data source comprises means for detecting said data source identifier in said identifier bus, means for assembling said data bits supplied progressively from said data source into said data bit groups, means for detecting each of said assembled data bit groups to deliver a triggering signal in response to each detected data source identifier following said data bit group assembly, and means for transmitting a packet made up of said data source identifier and said assembled data bit group into said packet bus in response to said triggering signal.

9. The system claimed in claim 8, wherein said assembling means in said access means comprises a first-in first-out (FIFO) buffer having a capacity equal at least to 2b bits.

10. The system claimed in 6, wherein said identifier bus further comprises a digital transmission line for transmiting pulses synchronous with said frame identifiers inserted during said second half-periods of said time slots and provided from said N-reading address providing means.

* * * * *